United States Patent
Tsukamoto

(10) Patent No.: US 11,195,508 B2
(45) Date of Patent: Dec. 7, 2021

(54) INFORMATION PROCESSING DEVICE, INFORMATION PROCESSING METHOD, AND PROGRAM FOR GENERATING SYNTHESIZED AUDIO CONTENT FROM TEXT WHEN AUDIO CONTENT IS NOT REPRODUCIBLE

(71) Applicant: TOYOTA JIDOSHA KABUSHIKI KAISHA, Toyota (JP)

(72) Inventor: Jun Tsukamoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 16/567,628

(22) Filed: Sep. 11, 2019

(65) Prior Publication Data
US 2020/0160834 A1    May 21, 2020

(30) Foreign Application Priority Data
Nov. 19, 2018    (JP) .............................. JP2018-216668

(51) Int. Cl.
| | | |
|---|---|---|
| *G10L 13/00* | (2006.01) | |
| *G10L 13/047* | (2013.01) | |
| *G10L 15/26* | (2006.01) | |

(52) U.S. Cl.
CPC ............ *G10L 13/047* (2013.01); *G10L 15/26* (2013.01)

(58) Field of Classification Search
CPC ....................................................... G10L 13/00
See application file for complete search history.

(56) References Cited

U.S. PATENT DOCUMENTS

2008/0015860 A1\*   1/2008   Lane ...................... G10L 13/047
                                                          704/258
2019/0130894 A1\*   5/2019   Jin .......................... G10L 13/04

FOREIGN PATENT DOCUMENTS

JP      2006-041721 A     2/2006

\* cited by examiner

*Primary Examiner* — Jialong He
(74) *Attorney, Agent, or Firm* — Oliff PLC

(57) ABSTRACT

An information processing device according to embodiments includes a communication unit configured to receive audio data of content and text data corresponding to the audio data, an audio data reproduction unit configured to perform reproduction of the audio data, a text data reproduction unit configured to perform the reproduction by audio synthesis of the text data, and a controller that controls the reproduction of the audio data or the text data. The controller causes the text data reproduction unit to perform the reproduction of the text data when the audio data reproduction unit is unable to perform the reproduction of the audio data.

9 Claims, 3 Drawing Sheets

INFORMATION PROCESSING DEVICE, INFORMATION PROCESSING METHOD, AND PROGRAM FOR GENERATING SYNTHESIZED AUDIO CONTENT FROM TEXT WHEN AUDIO CONTENT IS NOT REPRODUCIBLE

INCORPORATION BY REFERENCE

The disclosure of Japanese Patent Application No. 2018-216668 filed on Nov. 19, 2018 including the specification, drawings and abstract is incorporated herein by reference in its entirety.

BACKGROUND

1. Technical Field

The disclosure relates to an information processing device, an information processing method, and a program.

2. Description of Related Art

In the related art, a technique is known in which a distribution server that distributes audio content (hereinafter referred to as "content") distributes content through a communication network such as a wireless local area network (LAN).

For example, Japanese Unexamined Patent Application Publication No. 2006-41721 (JP 2006-41721 A) discloses a technique that downloads download content in parallel with reproduction of streaming content and switches from the reproduction of the streaming content to reproduction of the download content after the download is completed.

SUMMARY

In general, there may be a long time to complete the download of content depending on a data amount or a communication speed. Therefore, with the technique disclosed in JP 2006-41721 A, when a client moves outside a cover area of a base station before the completion of the content download and during the streaming reproduction, it is impossible to perform the reproduction of the content. In addition, with the technique disclosed in JP 2006-41721 A, it is impossible to perform the reproduction of the content until the content needed for the streaming reproduction is received at the time of starting the reproduction of the content. In this manner, in the related art, there is a possibility that the reproduction of the content cannot be performed.

The disclosure provides an information processing device, an information processing method, and a program capable of reducing a possibility that reproduction of content distributed from a server cannot be performed.

A first aspect of the disclosure relates to an information processing device including a communication unit, an audio data reproduction unit, a text data reproduction unit, and a controller. The communication unit is configured to receive audio data of content and text data corresponding to the audio data. The audio data reproduction unit is configured to perform reproduction of the audio data. The text data reproduction unit is configured to perform reproduction by audio synthesis of the text data. The controller is configured to control the reproduction of the audio data or the text data. The controller causes the text data reproduction unit to perform the reproduction of the text data when the audio data is not reproducible by the audio data reproduction unit.

A second aspect of the disclosure relates to an information processing method in an information processing device including an audio data reproduction unit configured to perform reproduction of audio data of content and a text data reproduction unit configured to perform reproduction by audio synthesis of text data corresponding to the audio data. The method includes a step of receiving the audio data and the text data, and a step of controlling the reproduction of the audio data or the text data. The text data reproduction unit is caused to perform the reproduction of the text data when the audio data is not reproducible by the audio data reproduction unit.

A third aspect of the disclosure relates to a program causing an information processing device including an audio data reproduction unit configured to perform reproduction of audio data of content and a text data reproduction unit configured to perform reproduction by audio synthesis of text data corresponding to the audio data to execute a step of receiving the audio data and the text data, and a step of controlling the reproduction of the audio data or the text data. The text data reproduction unit is caused to perform the reproduction of the text data when the audio data is not reproducible by the audio data reproduction unit.

With the information processing device, the information processing method, and the program according to the aspects of the disclosure, it is possible to reduce the possibility that the reproduction of the content distributed from the server cannot be performed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
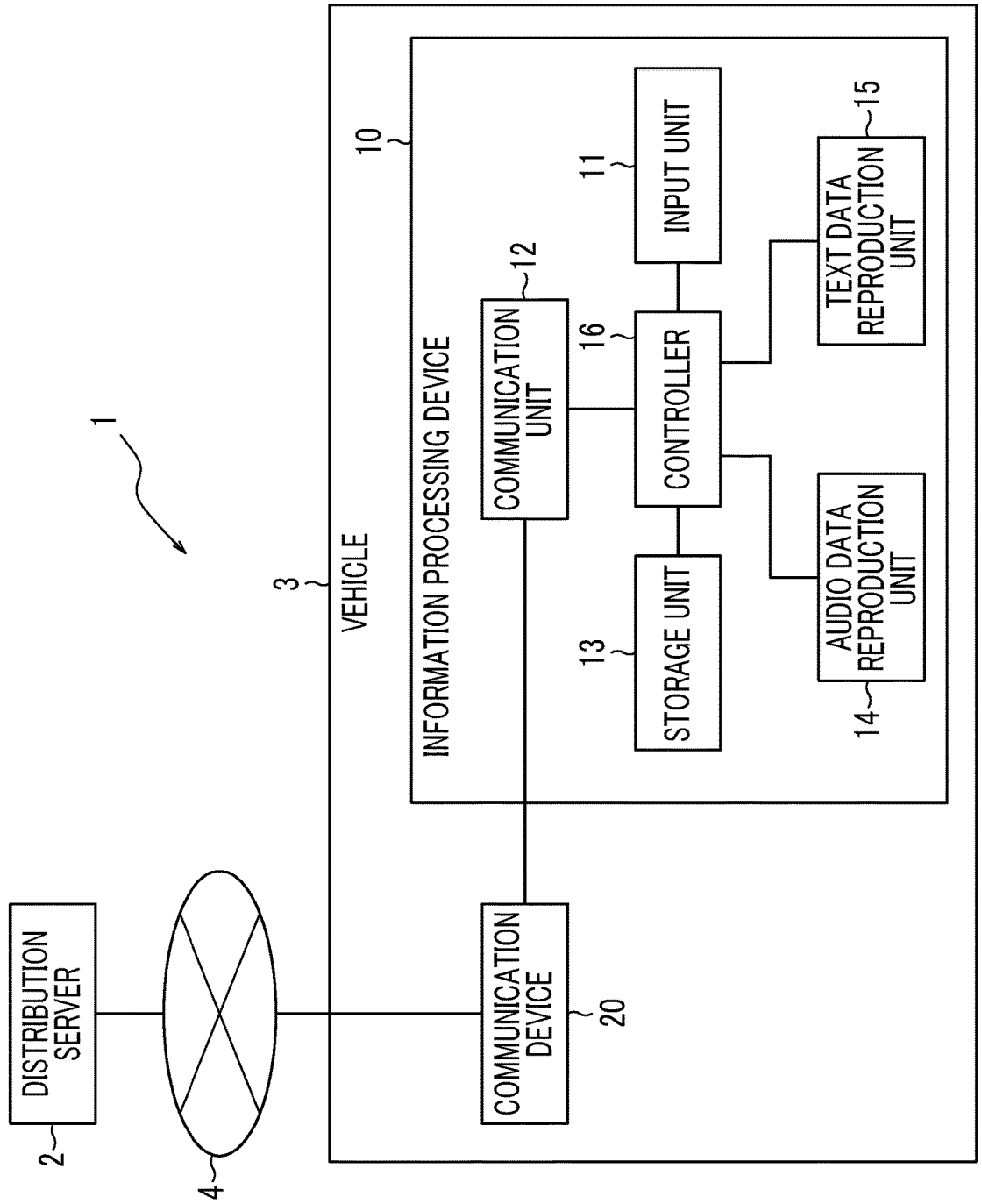
FIG. 1 is a diagram showing a configuration example of an information processing system including an information processing device according to an embodiment.

Hereinafter, an embodiment will be described with reference to drawings. In each drawing, the same reference numeral indicates the same or equivalent configuration element.

FIG. 1 is a diagram showing a configuration example of an information processing system 1 including an information processing device 10 according to an embodiment.

The information processing system 1 shown in FIG. 1 includes a distribution server 2 and the information processing device 10.

The distribution server 2 distributes audio content (content) such as reading of news or a response to a user in an interactive system that performs audio interaction with the user. Specifically, the distribution server 2 distributes audio data of the content and text data corresponding to the audio data. The text data corresponding to the audio data is data representing the same contents as the audio data as a text. The text data corresponding to the audio data is, for example, data in which audio of the audio data is written in text, data which is formed of a phonetic symbol string referred to as an intermediate language, or the like. And the intermediate language is generated by reading the text in which the audio of the audio data is written or language analysis of accent, prosody, or the like, or the like.

The information processing device 10 acquires (receives) the audio data and the text data of the content distributed from the distribution server 2 and reproduces the content. The information processing device 10 is, for example, a car navigation device mounted on a vehicle 3. A communication device 20 capable of communicating with the distribution server 2 through a network 4 is mounted on the vehicle 3. The network 4 includes, for example, networks such as a mobile communication network and the Internet, and may include a predetermined communication network.

The vehicle 3 is, for example, an automobile, but is not limited thereto, and may be any vehicle on which a person can ride. The vehicle 3 is, a vehicle driven by a user, but is not limited thereto, and may be, for example, a vehicle that performs autonomous driving. The autonomous driving includes, for example, level 1 or 5 defined in Society of Automotive Engineers (SAE), but is not limited thereto, and may be defined randomly. The distribution server 2 includes one or a plurality of server devices capable of communicating with each other. In the embodiment, a case where the distribution server 2 includes one server device will be described for simplicity of description.

The communication device 20 performs wireless communication with a base station constituting the network 4. The communication device 20 may be, for example, an on-vehicle communication apparatus such as a data communication module (DCM). The communication device 20 may include a communication module compatible with mobile communication standards such as 4G and 5G to connect to the network 4.

When the information processing device 10 is mounted on the vehicle 3, the information processing device 10 acquires the audio data and the text data of the content via the network 4 through the communication device 20. The information processing device 10 may be a communication device including a wireless communication function, such as a portable telephone, a smartphone, or a tablet terminal. In this case, the information processing device 10 may directly access the network 4 without through the communication device 20 to acquire the audio data and the text data of the content from the distribution server 2. In the following, a case where the information processing device 10 is mounted on the vehicle 3 and acquire the audio data and the text data of the content via the network 4 through the communication device 20 will be described.

Next, a configuration of the information processing device 10 will be described. The distribution server 2 may have any configuration as long as functions of associating and holding the audio data and the text data of the content and of distributing (streaming distribution or download distribution) these pieces of data through the network 4 are included. Therefore, description of the configuration of the distribution server 2 is omitted.

The information processing device 10 shown in FIG. 1 includes an input unit 11, a communication unit 12, a storage unit 13, an audio data reproduction unit 14, a text data reproduction unit 15, and a controller 16.

The input unit 11 accepts an operation input by a user and outputs a signal in response to the input operation to the controller 16. The input unit 11 is configured of, for example, a button, a switch, a dial knob, or the like. In addition, the input unit 11 may be configured as a touch panel in which a touch surface of a touch sensor is disposed on a display surface of a display unit when the information processing device 10 includes the display unit. In addition, the input unit 11 may be configured as a microphone that accepts an audio input.

The communication unit 12 receives the audio data and the text data of the content distributed from the distribution server 2 through the communication device 20 according to the control of the controller 16. In addition, the communication unit 12 may transmit various requests to the distribution server 2 through the communication device 20 according to the control of the controller 16.

The storage unit 13 includes one or more memories. In the embodiment, the "memory" is, for example, a semiconductor memory, a magnetic memory, or an optical memory, but is not limited thereto. Each memory included in the storage unit 13 may function as, for example, a main storage device, an auxiliary storage device, or a cache memory. The storage unit 13 stores predetermined information used for the operation of the information processing device 10. For example, the storage unit 13 may store a system program and an application program. In addition, the storage unit 13 may store the audio data and the text data of the content received by the communication unit 12.

The audio data reproduction unit 14 performs the reproduction of the audio data received by the communication unit 12 according to the control of the controller 16. The audio data reproduction unit 14 can perform streaming reproduction for reproduction of the audio data in parallel with the reception of the audio data or download reproduction of performing the reproduction of the received audio data after the reception of the audio data is completed.

The text data reproduction unit 15 performs the reproduction by audio synthesis (audio synthesis reproduction) of the text data received by the communication unit 12 according to the control of the controller 16.

For example, when the information processing device 10 is mounted on a vehicle including a speaker, the audio data reproduction unit 14 and the text data reproduction unit 15 reproduce the content through the speaker included in the vehicle. In addition, for example, when the information processing device 10 itself includes a speaker, the audio data reproduction unit 14 and the text data reproduction unit 15 reproduce the content through the speaker included in the information processing device 10.

In the streaming reproduction, audio quality of the reproduced content is good but the reproduction is interrupted when the communication environment deteriorates. In addition, in the download reproduction, the audio quality of the reproduced content is good but the reproduction cannot be started until the download of the audio data having large data amount completes. In addition, in the audio synthesis reproduction, the data amount of the text data needed for the reproduction is significantly small but the audio quality of the reproduced content is poor compared with the streaming reproduction and the download reproduction. In this manner, the content reproduction, the download reproduction, and the audio synthesis reproduction respectively have advantages and disadvantages. In the embodiment, the information processing device 10 can reduce a possibility that the reproduction of the content distributed from the distribution server 2 cannot be performed, by combining these reproduction methods as described below.

The controller 16 includes one or more processors. The controller 16 controls the operation of the entire information processing device 10. For example, the controller 16 controls the reproduction of the audio data and the text data received by the communication unit 12. Specifically, when the audio data reproduction unit 14 cannot perform the reproduction of the audio data, the controller 16 causes the text data reproduction unit 15 to perform the reproduction of the text data. In general, the text data has a small data amount compared with the audio data and thus the download can be performed in a short time. Therefore, even when the reproduction of the audio data cannot be performed, there is a high possibility that the download of the text data completes and the audio synthesis reproduction of the text data is possible. Therefore, when the reproduction of the audio data cannot be performed, it is possible to reduce the possibility that the reproduction of the content distributed from the distribution server 2 cannot be performed, by performing the reproduction of the text data.

Next, the operation of the information processing device 10 according to the embodiment will be described. As described above, when the audio data reproduction unit 14 cannot perform the reproduction of the audio data, the information processing device 10 according to the embodiment causes the text data reproduction unit 15 to perform the reproduction of the text data. A situation where the audio data cannot be reproduced occurs, for example, at the time of starting the reproduction of the audio data, during the streaming reproduction, and the like. In the following, the operation of the information processing device 10 will be described with these two cases as examples.

Figure 2:
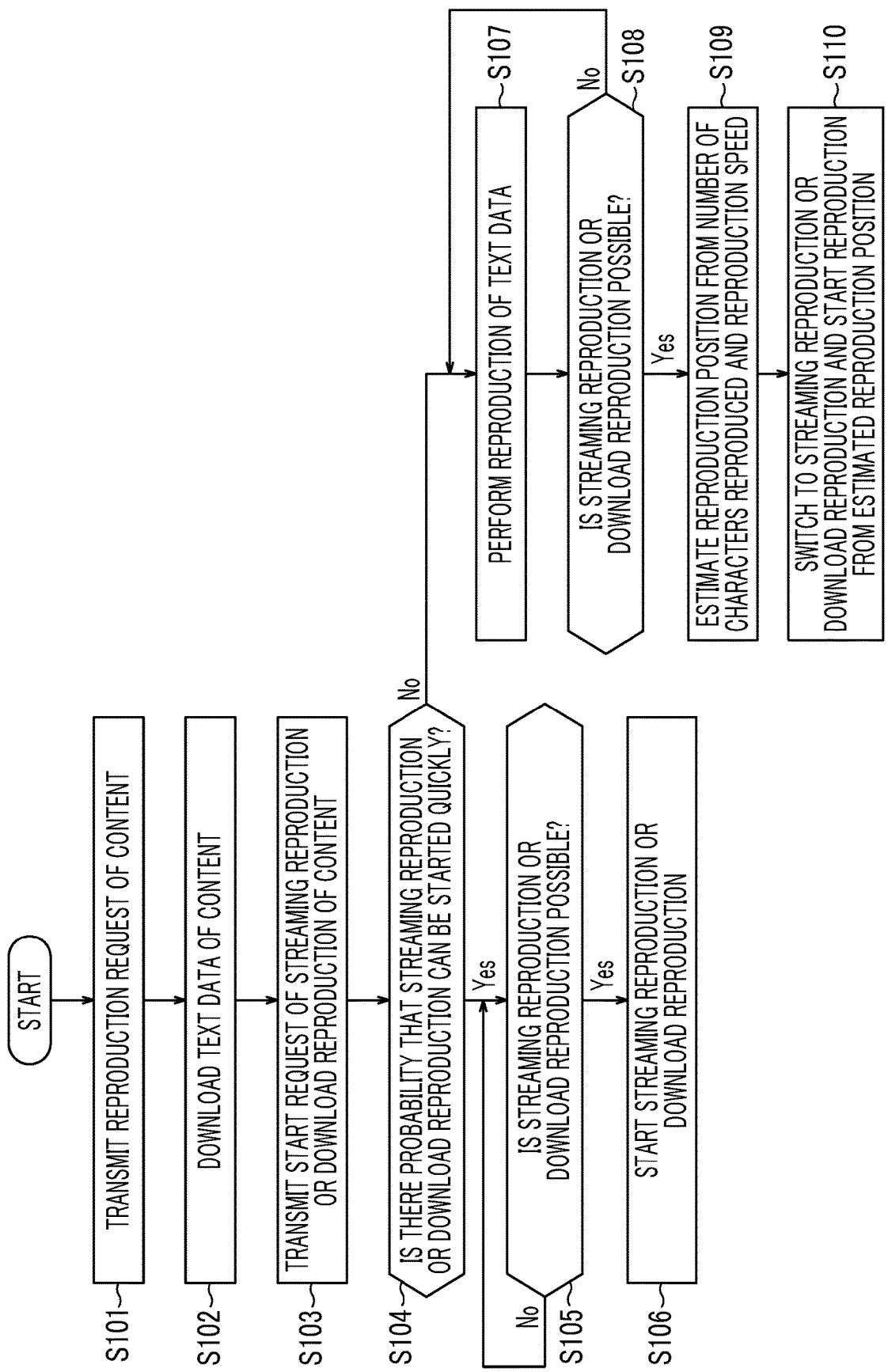
FIG. 2 is a flowchart showing an example of an operation of the information processing device shown in FIG. 1.

First, the operation of the information processing device 10 at the time of starting the reproduction of the audio data will be described with reference to the flowchart shown in FIG. 2, focusing on the operation of the controller 16.

Step S101: For example, when an operation of requesting the reproduction of the content is input through the input unit 11, the controller 16 causes the communication unit 12 to transmit the reproduction request requesting the reproduction of the content to the distribution server 2. When the reproduction request transmitted from the information processing device 10 is received, the distribution server 2 starts the distribution of the text data of the content requested to be reproduced.

Step S102: When the distribution server 2 starts the distribution of the text data of the content, the communication unit 12 downloads the text data.

Step S103: When the download of the text data completes, the controller 16 causes the communication unit 12 to transmit a request of starting the streaming reproduction or the download reproduction of the content to the distribution server 2. When the start request transmitted from the information processing device 10 is received, the distribution server 2 starts the distribution of the audio data for the streaming reproduction or the download reproduction of the content in response to the start request.

Step S104: The controller 16 determines whether there is a probability that the streaming reproduction or the download reproduction can be started quickly (for example, within a predetermined time). The controller 16 determines whether there is the probability that the streaming reproduction or the download reproduction can be started quickly, for example, based on a reception speed of the audio data distributed from the distribution server 2. That is, when the reception speed of the audio data is faster than a predetermined reference, the controller 16 determines that there is the probability that the streaming reproduction or the download reproduction can be started quickly. When the determination is made that there is the probability that the streaming reproduction or the download reproduction can be started quickly (step S104: Yes), the controller 16 proceeds to processing of step S105. When determination is made that there is no probability that the streaming reproduction or the download reproduction can be started quickly (step S104: No), the controller 16 proceeds to processing of step S107. Even when the determination is made that there is no probability that the streaming reproduction or the download reproduction can be started quickly, the controller 16 causes the communication unit 12 to continuously receive the audio data.

Step S105: The controller 16 determines whether the streaming reproduction or the download reproduction is possible. That is, the controller 16 determines whether the reception of the audio data needed for starting the streaming reproduction is completed in the case of the streaming reproduction. In addition, the controller 16 determines whether the download of the audio data of the content is completed in the case of the download reproduction. When determination is made that the streaming reproduction or the download reproduction is impossible (step S105: No), the controller 16 repeats the processing of step S105. When determination is made that the streaming reproduction or the download reproduction is possible (step S105: Yes), the controller 16 proceeds to processing of step S106.

Step S106: When the streaming reproduction or the download reproduction is possible, the controller 16 causes the audio data reproduction unit 14 to start the streaming reproduction or the download reproduction of the received audio data.

Step S107: When there is no probability that the streaming reproduction or the download reproduction can be started quickly, the controller 16 causes the text data reproduction unit 15 to perform the reproduction by the audio synthesis of the received text data.

Step S108: The controller 16 determines whether the streaming reproduction or the download reproduction is possible during the reproduction of the text data. That is, the controller 16 determines whether the reception of the audio data needed for starting the streaming reproduction is completed in the case of the streaming reproduction. In addition, the controller 16 determines whether the download of the audio data of the content is completed in the case of the download reproduction. When determination is made that the streaming reproduction or the download reproduction is impossible (step S108: No), the controller 16 returns to the processing of step S107. When determination is made that the streaming reproduction or the download reproduction is possible (step S108: Yes), the controller 16 proceeds to processing of step S109.

Step S109: The controller 16 estimates a reproduction position of the content by the text data reproduction unit 15 from the number of characters of the text data reproduced by the text data reproduction unit 15 and a reproduction speed of the text data. The estimation of the reproduction position of the content by the text data reproduction unit 15 will be described below in detail.

Step S110: The controller 16 switches the reproduction of the content from the reproduction of the text data by the text data reproduction unit 15 to the reproduction (streaming reproduction or download reproduction) of the audio data by the audio data reproduction unit 14, and causes the audio data reproduction unit 14 to perform the reproduction of the audio data from the estimated reproduction position.

When the controller 16 causes the audio data reproduction unit 14 to start the download reproduction by the processing of step S106 or step S110, for example, determination is made whether the reproduction of the content ends and the processing ends when determination is made that the reproduction of the content ends. In addition, when the controller 16 causes the audio data reproduction unit 14 to start the streaming reproduction, for example, the controller 16 shifts to a flow shown in FIG. 3 described below.

Figure 3:
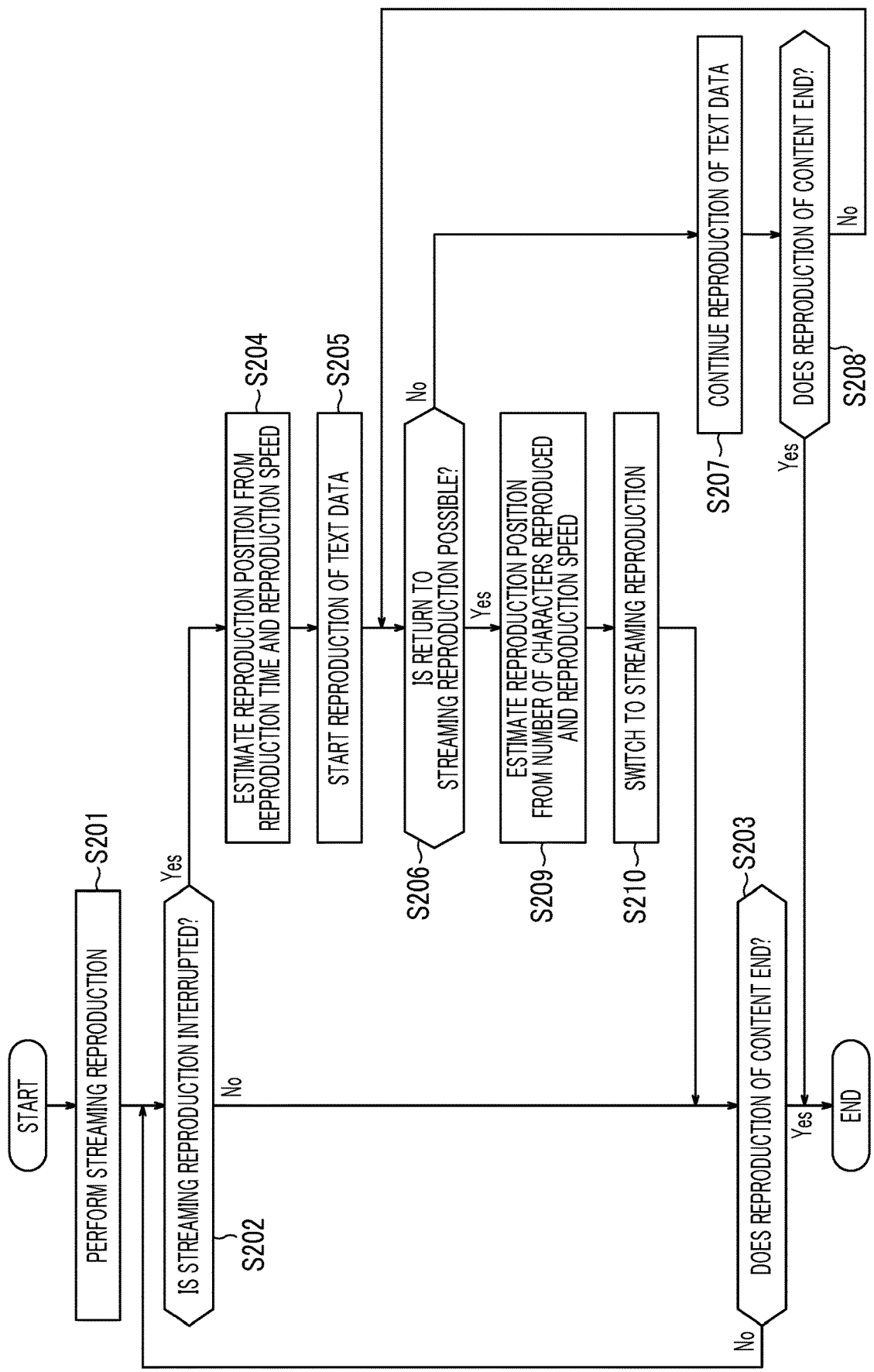
FIG. 3 is a flowchart showing another example of the operation of the information processing device shown in FIG. 1.

Next, the operation of the information processing device 10 during the streaming reproduction will be described with reference to a flowchart shown in FIG. 3, focusing on the operation of the controller 16.

Step S201: When the audio data needed for the streaming reproduction is received, the controller 16 causes the audio data reproduction unit 14 to perform the streaming reproduction of the received audio data.

Step S202: The controller 16 determines whether the streaming reproduction is interrupted. For example, when the audio data cannot be received from the distribution server 2, that is, the communication with the distribution server 2 is interrupted, the controller 16 determines that the streaming reproduction is interrupted. When determination is made that the streaming reproduction is not interrupted (step S202: No), the controller 16 proceeds to processing of step S203. When determination is made that the streaming reproduction is interrupted (step S202: Yes), the controller 16 proceeds to processing of step S204.

By doing this, it is possible to continue the streaming reproduction of the content by the audio data having high audio quality as much as possible and then switch to the reproduction of the text data.

Step S203: The controller 16 determines whether the reproduction of the content (the reproduction of the content by the streaming reproduction) ends. When determination is made that the reproduction of the content ends (step S203: Yes), the controller 16 ends the processing. When determination is made that the reproduction of the content does not end (step S203: No), the controller 16 returns to the processing of step S202.

Step S204: When the determination is made that the streaming reproduction is interrupted, the controller 16 estimates a reproduction position of the content by the audio data reproduction unit 14 from a reproduction time and a reproduction speed of the streaming reproduction. The estimation of the reproduction position of the content by the audio data reproduction unit 14 will be described below in detail.

Step S205: The controller 16 switches the reproduction of the content from the streaming reproduction by the audio data reproduction unit 14 to the reproduction of the text data by the text data reproduction unit 15, and causes the text data reproduction unit 15 to start the reproduction of the text data from the estimated reproduction position of the content by the audio data reproduction unit 14.

The controller 16 may temporarily buffer the audio data before the reproduction in the storage unit 13 when the reception speed of the audio data by the communication unit 12 is a reception speed sufficient for the streaming reproduction by the audio data reproduction unit 14. In this case, when the streaming reproduction is interrupted, the controller 16 may cause the audio data reproduction unit 14 to perform the reproduction of the unreproduced audio data buffered in the storage unit 13 and then cause the text data reproduction unit 15 to perform the reproduction of the text data from the reproduction position of the content by the audio data reproduction unit 14.

Step S206: The controller 16 determines whether a return to the streaming reproduction is possible. The controller 16 determines whether the return to the streaming reproduction is possible, for example, based on whether the communication with the distribution server 2 recovers and the audio data needed for the streaming reproduction is received. When determination is made that the return to the streaming reproduction is impossible (step S206: No), the controller 16 proceeds to processing of step S207. When determination is made that the return to the streaming reproduction is possible (step S206: Yes), the controller 16 proceeds to processing of step S209.

Step S207: Since the return to the streaming reproduction is impossible, the controller 16 continues the reproduction of the text data by the text data reproduction unit 15.

Step S208: The controller 16 determines whether the reproduction of the content (the reproduction of the content by the reproduction of the text data) ends. When determination is made that the reproduction of the content ends (step S208: Yes), the controller 16 ends the processing. When determination is made that the reproduction of the content does not end (step S208: No), the controller 16 returns to the processing of step S206.

Step S209: In order to return to the streaming reproduction, the controller 16 estimates a reproduction position of the content by the text data reproduction unit 15 from the number of reproduced characters and a reproduction speed of the text data by the text data reproduction unit 15. The estimation of the reproduction position of the content by the text data reproduction unit 15 will be described below in detail.

Step S210: The controller 16 switches the reproduction of the content from the reproduction of the text data by the text data reproduction unit 15 to the streaming reproduction by the audio data reproduction unit 14, and causes the audio data reproduction unit 14 to start the streaming reproduction from the estimated reproduction position of the content by the text data reproduction unit 15. Thereafter, the controller 16 proceeds to the processing of step S203.

Next, an estimation method of the reproduction position of the content by the audio data reproduction unit 14 and the text data reproduction unit 15 will be described. First, the estimation method of the reproduction position of the content by the text data reproduction unit 15 will be described.

As described above, the controller 16 estimates the reproduction position of the content by the text data reproduction unit 15 from the number of characters of the text data reproduced by the text data reproduction unit 15 and the reproduction speed of the content. Specifically, the controller 16 multiplies the number of characters of the text data reproduced by the text data reproduction unit 15 by the reproduction speed of the text data to estimate the reproduction time of the text data by the text data reproduction unit 15. The controller 16 estimates a position advanced by the estimated reproduction time from a position of the content where the text data reproduction unit 15 starts the reproduction as the reproduction position of the content in the audio data.

For example, it is assumed that the text data reproduction unit 15 reproduces text data of "こんにちは。いいてんきですね。(Konnichiwa. Iitenkidesune.: Hello. It's nice weather)" at a reproduction speed of 0.3 seconds/character. However, a period "。" is assumed to take one second. In this case, the controller 16 estimates the reproduction time of the content by the text data reproduction unit 15 as 13 characters (こんにちはいいてんきですね (KonnichiwaIitenkidesune.: HelloIt's nice weather))×0.3 seconds/character+2 seconds (period "。"×2 pieces)=5.9 seconds. The controller 16 estimates a position advanced by the estimated reproduction time (5.9 seconds) from the position of the content where the text data reproduction unit 15 starts the reproduction as the reproduction position of the content by the text data reproduction unit 15.

However, the actual reproduction speed of the text data varies with a sentence of the content. Therefore, the controller 16 may cause the audio data reproduction unit 14 to start the reproduction of the audio data from a position before the content reproduction position estimated by the above calculation by a predetermined time. That is, the controller 16 may estimate the reproduction time of the content according to an equation of reproduced character× reproduction speed−error correction (correction time for correcting reproduction time). By doing this, there is a possibility that some contents of the content are reproduced redundantly at the time of the switching, but it is possible to reduce a possibility that skipping in which the contents of the content are missing occurs.

In general, there is a possibility that the error is larger as the number of characters of the text data reproduced by the text data reproduction unit 15 is larger. Therefore, the controller 16 may be made the value of the error correction described above larger as the number of characters of the text data reproduced by the text data reproduction unit 15 is larger.

In general, there is a case where the reproduction speed of the text data is different depending on a genre of the content. Therefore, the controller 16 may change the reproduction speed of the text data of the content based on the genre of the content. By doing this, it is possible to estimate an appropriate reproduction position depending on the genre of the content. The genre of the content can be discriminated, for example, by adding an identifier indicating the genre of the content to the text data of the content.

Next, the estimation method of the reproduction position of the content by the audio data reproduction unit 14 will be described.

As described above, the controller 16 estimates the reproduction position of the content by the audio data reproduction unit 14 from the reproduction time and the reproduction speed of the audio data by the audio data reproduction unit 14. Specifically, the controller 16 divides the reproduction time of the audio data by the audio data reproduction unit 14 by the reproduction speed of the audio data to estimate the number of reproduced characters of the content by the audio data reproduction unit 14. The controller 16 estimates a position advanced by the estimated number of reproduced characters from a position of the content where the audio data reproduction unit 14 starts the reproduction as the reproduction position of the content by the audio data reproduction unit 14.

For example, it is assumed that the audio data reproduction unit 14 reproduces audio data of "こんにちは。いいてんきですね。(Konnichiwa. Iitenkidesune.: Hello. It's nice weather)" for three seconds. Here, the reproduction speed of the content by the audio data reproduction unit 14 is assumed to be 0.3 seconds/character. However, a period " 。" is assumed to be three characters. In this case, the controller 16 estimates the number of reproduced characters of the audio data by the audio data reproduction unit 14 as 3 seconds÷0.3 seconds+3 characters (for one period " 。")=13 characters. Therefore, the controller 16 estimates a position (14th character) advanced by the estimated number of reproduced characters (13 characters) from the position of the content where the audio data reproduction unit 14 starts the reproduction as the reproduction position of the content by the audio data reproduction unit 14.

However, the actual reproduction speed of the audio data varies with a sentence of the content. Therefore, the controller 16 may cause the text data reproduction unit 15 to start the reproduction of the text data from a position before the reproduction position of the content estimated by the above calculation by a predetermined time. That is, the controller 16 may estimate the reproduction time of the content according to an equation of estimated reproduction position−error correction (correction time for correcting reproduction time).

For example, it is assumed that the audio data reproduction unit 14 reproduces "こんにちは。いいて (Konnichiwa. Iiten: Hello. It's nice wea)" of the audio data of "こんにちは。いいてんき ですね。(Konnichiwa. Iitenkidesune.: Hello. It's nice weather)" described above. In this case, when the text data reproduction unit 15 switches the reproduction of the text data from the middle of the word "てんき (tenki.: weather)", it is difficult for a user to grasp the contents of the content. Therefore, the controller 16 may cause the text data reproduction unit 15 to perform the reproduction of the text data, for example, from the immediately preceding period (in the above example, from "いいてんき (Iitenki.: nice weather)").

In general, there is a possibility that the error is larger as the reproduction time of the audio data by the audio data reproduction unit 14 is longer. Therefore, the controller 16 may make the value of the error correction described above larger as the reproduction time of the audio data by the audio data reproduction unit 14 is longer.

The estimation of the reproduction position of the content is not limited to the above methods. For example, when a microphone for collecting audio around the vehicle 3 on which the information processing device 10 is mounted is mounted or when the information processing device 10 itself includes a microphone, the controller 16 may analyze the audio collected by the microphone during the reproduction of the content to estimate the reproduction position of the content. When there is no microphone, the controller 16 may cause an audio signal output from the audio data reproduction unit 14 to a speaker to be branched and input to the controller 16 to estimate the reproduction position of the content by the audio data reproduction unit 14.

For the estimation of the reproduction position of the content, the case where the content is Japanese is described as an example. However, the disclosure is not limited thereto. For example, when the content is English, the controller 16 may replace the reproduction speed from "n second/character" to "n second/word" and replace "the number of reproduced characters" by "the number of reproduced words" to estimate the reproduction position of the content.

In this manner, in the embodiment, the information processing device 10 includes the communication unit 12 that receives the audio data of the content and the text data corresponding to the audio data, the audio data reproduction unit 14 that performs the reproduction of the audio data, the text data reproduction unit 15 that performs the reproduction by the audio synthesis of the text data, and the controller 16 that controls the reproduction of the audio data or the text data. The controller 16 causes the text data reproduction unit 15 to perform the reproduction of the text data when the audio data reproduction unit 14 cannot perform the reproduction of the audio data.

In general, text data corresponding to audio data has a small data amount compared with the audio data and thus the reception of the text data is completed in a short time. Therefore, there is a high possibility that the reception of the text data is completed before the reproduction of the audio data is possible or even when the reproduction of the audio data (streaming reproduction) is impossible due to the interruption of the communication or the like. Therefore, when the reproduction of the audio data is impossible, it is possible to reduce the possibility that the content distributed from the distribution server 2 cannot be reproduced, by performing the reproduction of the text data.

The information processing device 10 has been described, and a computer may be used in order to function as the information processing device 10. Such a computer stores a program describing processing contents that realize each function of the information processing device 10 in a storage unit of the computer and causes a CPU of the computer to read and execute the program. In this manner, the computer realizes each function of the information processing device 10.

The program may be recorded in a computer-readable recording medium. With such a recording medium, it is possible to install the program on the computer. Here, the recording medium in which the program is recorded may be a non-transitory recording medium. The non-transitory recording medium is not particularly limited and may be a recording medium such as a CD-ROM or a DVD-ROM.

The above embodiment is described as a representative example, but it is apparent to those skilled in the art that various changes and replacements are possible within the spirit and scope of the disclosure. Therefore, the disclosure should not be interpreted as limited by the above embodiment, and various modifications and changes are possible without departing from the scope of the claims. For example, it is possible to combine a plurality of configuration blocks described in the configuration diagrams of the embodiment into one or to divide one configuration block.

What is claimed is:

1. An information processing device comprising:
a processor configured to function as:
a communication unit configured to receive audio data of content and text data corresponding to the audio data;
an audio data reproduction unit configured to perform reproduction of the audio data;
a text data reproduction unit configured to perform reproduction by audio synthesis of the text data; and
a controller configured to control reproduction of the audio data or the text data,
wherein the controller causes the text data reproduction unit to perform the reproduction of the text data when the received audio data is not reproducible by the audio data reproduction unit,
wherein the controller causes the text data reproduction unit to perform the reproduction of the text data from a reproduction position of the content by the audio data reproduction unit when the reproduction by the audio data reproduction unit is interrupted,
wherein the controller estimates the reproduction position of the content by the audio data reproduction unit from a reproduction time and a reproduction speed of the reproduction by the audio data reproduction unit,
wherein the controller causes the text data reproduction unit to perform the reproduction of the text data from a position before the estimated reproduction position by a predetermined time.

2. The information processing device according to claim 1, wherein:
the audio data reproduction unit performs streaming reproduction for reproduction of the received audio data in parallel with the reception of the audio data by the communication unit.

3. The information processing device according to claim 2, further comprising a storage unit that buffers the audio data received by the communication unit,
wherein the controller causes the audio data reproduction unit to perform the reproduction of unreproduced audio data buffered in the storage unit and then causes the text data reproduction unit to perform the reproduction of the text data from the reproduction position of the content by the audio data reproduction unit when the streaming reproduction by the audio data reproduction unit is interrupted.

4. The information processing device according to claim 1, wherein the controller switches from the reproduction of the text data by the text data reproduction unit to the streaming reproduction by the audio data reproduction unit when the streaming reproduction by the audio data reproduction unit is possible during the reproduction of the text data by the text data reproduction unit.

5. The information processing device according to claim 4, wherein the controller estimates a reproduction time of the text data from the number of reproduced characters and a reproduction speed of the text data by the text data reproduction unit, estimates a reproduction position of the content by text data reproduction unit based on the estimated reproduction time, and causes the audio data reproduction unit to perform the reproduction of the audio data from the estimated reproduction position.

6. The information processing device according to claim 5, wherein the controller causes the audio data reproduction unit to perform the reproduction of the audio data from a position before the estimated reproduction position by a predetermined time.

7. The information processing device according to claim 1, wherein:
the audio data reproduction unit performs streaming reproduction for reproduction of the received audio data in parallel with the reception of the audio data by the communication unit or download reproduction of performing the reproduction of the received audio data after the reception of the audio data of the content is completed, and
the controller causes the communication unit to receive the text data and then to receive the audio data, causes the text data reproduction unit to start the reproduction of the text data when the reception of the text data is completed, and switches from the reproduction of the text data by the text data reproduction unit to the reproduction of the audio data by the audio data reproduction unit when the streaming reproduction or the download reproduction by the audio data reproduction unit is possible.

8. An information processing method in an information processing device including an audio data reproduction unit configured to perform reproduction of audio data of content and a text data reproduction unit configured to perform reproduction by audio synthesis of text data corresponding to the audio data, the information processing method comprising:
a step of receiving the audio data and the text data; and
a step of controlling reproduction of the audio data or the text data, wherein the text data reproduction unit is caused to perform the reproduction of the text data when the received audio data is not reproducible by the audio data reproduction unit, wherein the text data reproduction unit is caused to perform the reproduction of the text data from a reproduction position of the content by the audio data reproduction unit when the reproduction by the audio data reproduction unit is interrupted, wherein the reproduction position of the content by the audio data reproduction unit is estimated from a reproduction time and a reproduction speed of the reproduction by the audio data reproduction unit, wherein the text data reproduction unit is caused to perform the reproduction of the text data from a position before the estimated reproduction position by a predetermined time.

9. A non-transitory computer readable medium storing a program causing an information processing device including an audio data reproduction unit configured to perform reproduction of audio data of content and a text data reproduction unit configured to perform reproduction by audio synthesis of text data corresponding to the audio data to execute a step of receiving the audio data and the text data, and a step of controlling reproduction of the audio data or the text data, wherein the text data reproduction unit is caused to perform the reproduction of the text data when the received audio data is not reproducible by the audio data reproduction unit, wherein the text data reproduction unit is caused to perform the reproduction of the text data from a reproduction position of the content by the audio data reproduction unit when the reproduction by the audio data reproduction unit is interrupted, wherein the reproduction position of the content by the audio data reproduction unit is estimated from a reproduction time and a reproduction speed of the streaming reproduction by the audio data reproduction unit, wherein the text data reproduction unit is caused to perform the reproduction of the text data from a position before the estimated reproduction position by a predetermined time.

* * * * *